United States Patent
Yang et al.

(10) Patent No.: US 10,101,539 B2
(45) Date of Patent: Oct. 16, 2018

(54) OPTICAL FIBER ADAPTER WITH SHUTTER MEMBERS

(71) Applicant: PROTAI PHOTONIC CO., LTD., New Taipei (TW)

(72) Inventors: Jyh-Cherng Yang, Taipei (TW); Yu-Kai Chen, Taipei (TW)

(73) Assignee: PROTAI PHOTONIC CO., LTD., New Taipei (TW)

( * ) Notice: Subject to any disclaimer, the term of this patent is extended or adjusted under 35 U.S.C. 154(b) by 11 days.

(21) Appl. No.: 15/597,269

(22) Filed: May 17, 2017

(65) Prior Publication Data
US 2018/0149813 A1    May 31, 2018

(30) Foreign Application Priority Data
Nov. 29, 2016 (TW) .............................. 105139331 A

(51) Int. Cl.
*G02B 6/38* (2006.01)
*G02B 6/26* (2006.01)

(52) U.S. Cl.
CPC ........... *G02B 6/3825* (2013.01); *G02B 6/262* (2013.01); *G02B 6/3849* (2013.01); *G02B 6/3851* (2013.01); *G02B 6/3893* (2013.01)

(58) Field of Classification Search
CPC .... G02B 6/3825; G02B 6/262; G02B 6/3849; G02B 6/3851; G02B 6/3893
See application file for complete search history.

(56) References Cited

U.S. PATENT DOCUMENTS

| | | | | |
|---|---|---|---|---|
| 5,825,955 A | * | 10/1998 | Ernst .................... | G02B 6/3825 385/38 |
| 5,883,995 A | * | 3/1999 | Lu ........................ | G02B 6/3807 385/53 |
| 5,887,098 A | * | 3/1999 | Ernst .................... | G02B 6/3825 385/55 |
| 5,909,526 A | * | 6/1999 | Roth .................... | G02B 6/3885 385/56 |
| 5,915,058 A | * | 6/1999 | Clairardin ............ | G02B 6/3825 385/55 |

(Continued)

FOREIGN PATENT DOCUMENTS

| TW | 201241495 A1 | 10/2012 |
|---|---|---|
| TW | 201348773 A | 12/2013 |

(Continued)

*Primary Examiner* — Peter Radkowski
(74) *Attorney, Agent, or Firm* — WPAT, PC

(57) ABSTRACT

An optical fiber adapter according to the present disclosure includes a main body, a first shutter member, a second shutter member, an inner housing, a first elastic member and a second elastic member. The first elastic member includes a first base portion, a first driving portion and a first connecting portion. The first connecting portion connects the first base portion with the first driving portion. The second shutter member includes a second base portion, a second driving portion and a second connecting portion. The second connecting portion connects the second base portion with the second driving portion. The inner housing is positioned within the main body through the first opening. The first shutter member is attached to and is driven to move by the first driving portion. The second shutter member is attached to and is driven to move by the second driving portion.

20 Claims, 20 Drawing Sheets

(56) References Cited

U.S. PATENT DOCUMENTS

| | | | | |
|---|---|---|---|---|
| 5,984,531 A * | 11/1999 | Lu | G02B 6/3807 | 385/53 |
| 6,076,973 A * | 6/2000 | Lu | G02B 6/3807 | 385/53 |
| 6,076,975 A * | 6/2000 | Roth | G02B 6/3825 | 385/60 |
| 6,079,881 A * | 6/2000 | Roth | G02B 6/3825 | 385/139 |
| 6,081,647 A * | 6/2000 | Roth | G02B 6/3825 | 385/139 |
| 6,108,482 A * | 8/2000 | Roth | G02B 6/3825 | 385/139 |
| 6,142,676 A * | 11/2000 | Lu | G02B 6/3807 | 385/139 |
| 6,154,597 A * | 11/2000 | Roth | G02B 6/3825 | 385/139 |
| 6,240,229 B1 * | 5/2001 | Roth | G02B 6/3825 | 385/53 |
| 6,296,398 B1 * | 10/2001 | Lu | G02B 6/3807 | 385/139 |
| 6,315,590 B1 * | 11/2001 | Grois | G02B 6/389 | 439/248 |
| 6,331,079 B1 * | 12/2001 | Grois | G02B 6/3821 | 385/53 |
| 6,361,218 B1 * | 3/2002 | Matasek | G02B 6/3821 | 385/53 |
| 6,371,657 B1 * | 4/2002 | Chen | G02B 6/3825 | 385/139 |
| 6,398,422 B1 * | 6/2002 | Szilagyi | G02B 6/3849 | 385/76 |
| 6,425,694 B1 * | 7/2002 | Szilagyi | G02B 6/3849 | 385/139 |
| 6,471,412 B1 * | 10/2002 | Belenkiy | G02B 6/3825 | 385/137 |
| 6,471,416 B2 * | 10/2002 | Lu | G02B 6/3807 | 385/139 |
| 6,554,482 B1 * | 4/2003 | Matasek | G02B 6/3825 | 385/136 |
| 6,715,928 B1 * | 4/2004 | Matasek | G02B 6/3897 | 385/56 |
| 6,764,222 B1 * | 7/2004 | Szilagyi | G02B 6/3849 | 385/55 |
| 6,824,311 B2 * | 11/2004 | Chen | G02B 6/3821 | 385/78 |
| 6,910,807 B2 * | 6/2005 | Lu | G02B 6/3807 | 385/53 |
| 7,029,322 B2 * | 4/2006 | Ernst | G02B 6/3897 | 385/56 |
| 7,118,288 B2 * | 10/2006 | Lu | G02B 6/3807 | 385/53 |
| 7,182,524 B2 * | 2/2007 | Kramer | G02B 6/3825 | 385/53 |
| 7,246,950 B2 * | 7/2007 | Lu | G02B 6/3807 | 385/53 |
| 7,384,201 B2 * | 6/2008 | Lu | G02B 6/3807 | 385/53 |
| 7,422,376 B2 * | 9/2008 | Chen | G02B 6/3821 | 385/78 |
| 7,503,702 B2 * | 3/2009 | Lu | G02B 6/3807 | 385/53 |
| 7,636,507 B2 * | 12/2009 | Lu | G02B 6/3825 | 385/135 |
| 7,654,749 B2 * | 2/2010 | Lu | G02B 6/3807 | 385/139 |
| 7,703,987 B2 * | 4/2010 | Kramer | G02B 6/3825 | 385/53 |
| 7,717,625 B2 * | 5/2010 | Margolin | G02B 6/3825 | 385/100 |
| 7,874,738 B2 * | 1/2011 | Lu | G02B 6/3807 | 385/139 |
| 7,927,023 B2 * | 4/2011 | Moriarty | G02B 6/3809 | 385/139 |
| 7,995,894 B2 * | 8/2011 | Solheid | G02B 6/3849 | 385/135 |
| 8,086,085 B2 * | 12/2011 | Lu | G02B 6/3825 | 385/134 |
| 8,186,890 B2 * | 5/2012 | Lu | G02B 6/3807 | 385/139 |
| 8,870,466 B2 * | 10/2014 | Lu | G02B 6/3807 | 385/139 |
| 9,383,524 B2 * | 7/2016 | Lu | G02B 6/3807 | |
| 2001/0043777 A1 * | 11/2001 | Lu | G02B 6/3807 | 385/60 |
| 2003/0021542 A1 * | 1/2003 | Lu | G02B 6/3807 | 385/60 |
| 2003/0147597 A1 | 8/2003 | Duran | | |
| 2005/0169583 A1 * | 8/2005 | Lu | G02B 6/3807 | 385/59 |
| 2005/0196106 A1 * | 9/2005 | Taira | G02B 6/3849 | 385/78 |
| 2005/0286833 A1 * | 12/2005 | Kramer | G02B 6/3825 | 385/55 |
| 2006/0285807 A1 * | 12/2006 | Lu | G02B 6/3825 | 385/92 |
| 2007/0086706 A1 * | 4/2007 | Lu | G02B 6/3807 | 385/55 |
| 2007/0117457 A1 * | 5/2007 | Kramer | G02B 6/3825 | 439/595 |
| 2007/0230874 A1 * | 10/2007 | Lin | G02B 6/3825 | 385/53 |
| 2007/0253666 A1 * | 11/2007 | Lu | G02B 6/3807 | 385/60 |
| 2008/0267566 A1 * | 10/2008 | En Lin | G02B 6/3825 | 385/53 |
| 2008/0279507 A1 * | 11/2008 | Liang-Ju | G02B 6/3807 | 385/60 |
| 2009/0046981 A1 * | 2/2009 | Margolin | G02B 6/3825 | 385/70 |
| 2009/0199398 A1 * | 8/2009 | Lu | G02B 6/3807 | 29/825 |
| 2010/0195958 A1 * | 8/2010 | Lu | G02B 6/3807 | 385/60 |
| 2010/0209053 A1 * | 8/2010 | Moriarty | G02B 6/3809 | 385/81 |
| 2011/0002591 A1 * | 1/2011 | Lu | G02B 6/3825 | 385/135 |
| 2011/0033164 A1 * | 2/2011 | Solheid | G02B 6/3849 | 385/135 |
| 2011/0235976 A1 * | 9/2011 | Lu | G02B 6/3807 | 385/58 |
| 2012/0251050 A1 | 10/2012 | Lin | | |
| 2013/0071066 A1 * | 3/2013 | Lu | G02B 6/3807 | 385/58 |
| 2015/0198770 A1 * | 7/2015 | Lu | G02B 6/3807 | 385/58 |
| 2015/0285999 A1 | 10/2015 | Mamiya et al. | | |
| 2016/0291259 A1 * | 10/2016 | Kanno | G02B 6/3814 | |

FOREIGN PATENT DOCUMENTS

| | | |
|---|---|---|
| TW | 201518798 A | 5/2015 |
| WO | 2012176844 | 12/2012 |

* cited by examiner

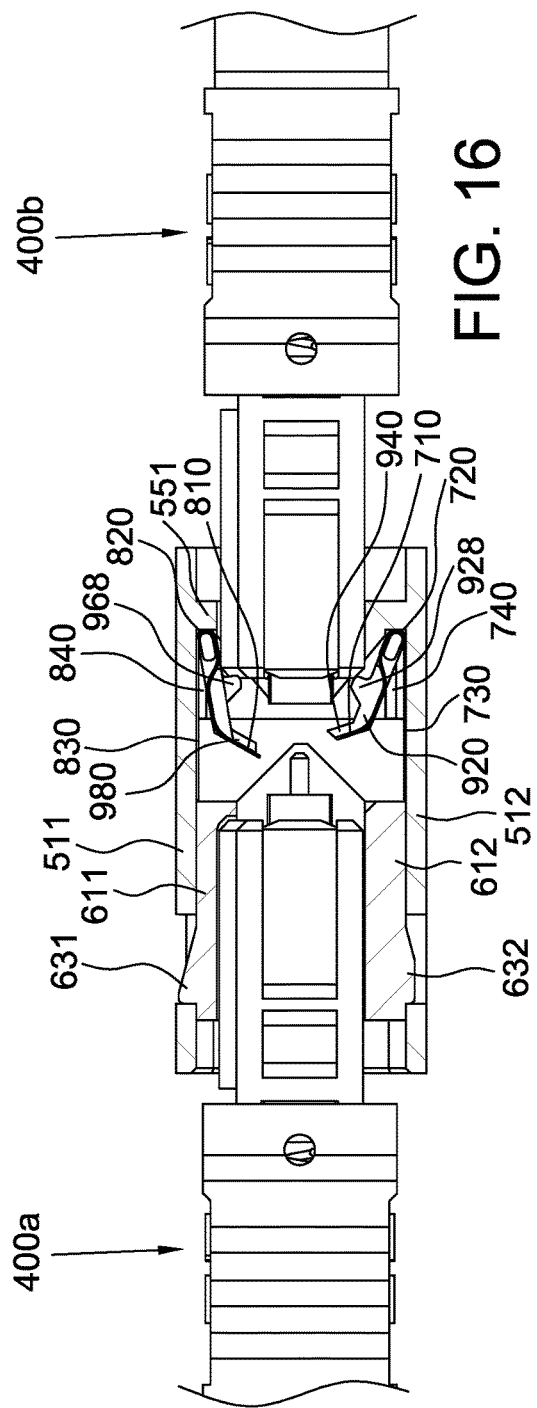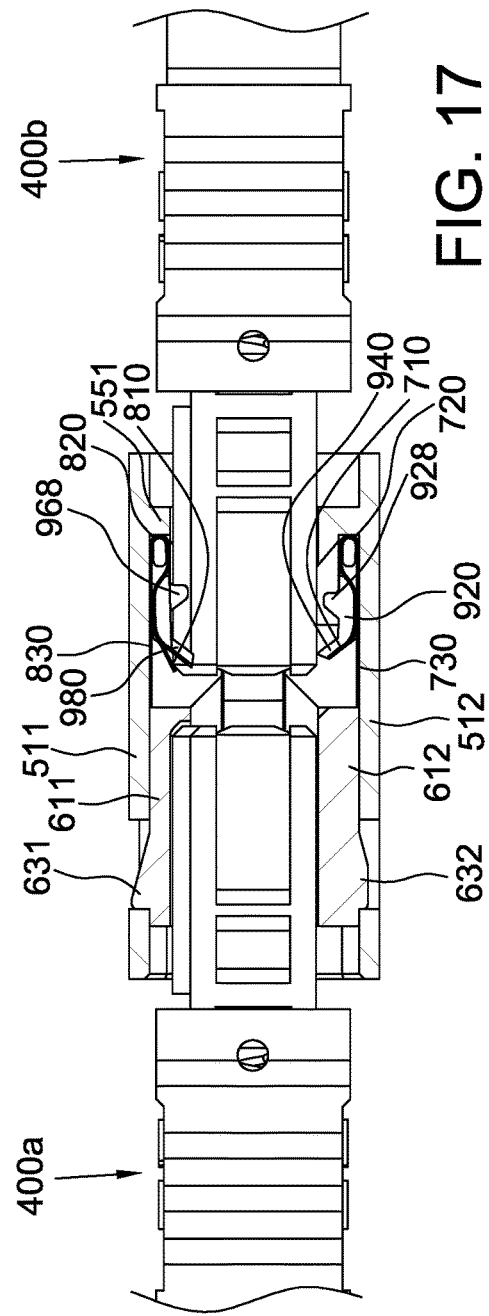

OPTICAL FIBER ADAPTER WITH SHUTTER MEMBERS

RELATED APPLICATION

The present application is based on and claims priority to Taiwanese Application Number 105139331, filed Nov. 29, 2016, the disclosure of which is hereby incorporated by reference herein in its entirety.

BACKGROUND

1. Technical Field

The disclosure relates to an optical fiber adapter, and more particularly, to an optical fiber adapter with shutter members.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Referring to FIG. 1, a conventional optical fiber adapter 100 includes a housing 110 having a plurality of side walls 160. The side walls 160 define a receiving recess 120. One of the side walls 160 is provided with a slot 130 for mating with the key 192 of an optical fiber connector 190 when the connector 190 is inserted into the receiving recess 120. In addition, the outer surfaces of two opposite side walls 160 are provided with recesses 140 that a clip (not shown in the figure) may be disposed thereon to facilitate the adapter 100 to be mounted on a panel.

In general, the adapter 100 further has another set of side walls 160 that defines another receiving recess 120. The two receiving recesses 120 are opposite and may respectively receive a connector 190. Of course, the two receiving recesses 120 of the adapter 100 may be designed to mate with two different types of connectors. The connector 190 is always attached to one end of an optical fiber cable 194 and a light beam may propagate down the optical fiber cable 194 and emit from the ferrule 196 of the connector 190. Likewise, a light beam may be coupled into the optical fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the optical fiber cable 194 of a connector 190 through the interface between the two ferrules 196 and then reach the optical fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitting light beam is high power and not obstructed, a lasting exposure to such light beam is harmful to people, particularly to the eyes. Thus, to avoid exposing to the high-power light beam, it is common to use a cap 180 to block up the unused receiving recess 120. This may obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Referring to FIG. 2, a conventional optical fiber adapter 200 is generally the same as the adapter 100 but further includes a cover 250 pivotally connected to the housing 110. The cover 250 covers the receiving recess 120 in its closed position. A spring 260 may force the cover 250 to be pivoted to its closed position when the receiving recess 120 is not mated with a connector 190. Thus, the cover 250 is capable of obstructing the light beam emitting from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Referring to FIG. 3, a conventional protection cap 300 for the optical fiber adapter 100 includes a hollow housing 310 with two opposing openings and a cover 350 pivotally connected to the housing 310. The cover 350 is pivoted to cover one of the two openings through a spring 360. The protection cap 300 may be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitting from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY

The present disclosure provides an optical fiber adapter with shutter members that may obstruct the light beams emitting from the accommodation room thereby preventing the eyes from exposure to the light beams. In addition, the optical fiber adapter may also be capable of preventing dust.

In one embodiment, the optical fiber adapter of the present disclosure includes a main body, a first elastic member, a second elastic member, a first shutter member, a second shutter member and an inner housing. The main body has an accommodation room defined by a first wall, a second wall, a third wall and a fourth wall, wherein the first wall faces the third wall and connects with the second and fourth walls. The accommodation room has opposing first and second openings in an axial direction, wherein the second opening is configured to allow a first optical fiber connector to insert into the accommodation room. The first elastic member includes a first base portion, a first driving portion and a first connecting portion. The first base portion is positioned on the third wall within the accommodation room. The first connecting portion connects the first base portion with the first driving portion. The first driving portion extends from the first connecting portion toward the first wall and is movable about the first connecting portion. The second elastic member includes a second base portion, a second driving portion and a second connecting portion. The second base portion is positioned on the first wall within the accommodation room. The second connecting portion connects the second base portion with the second driving portion. The second driving portion extends from the second connecting portion toward the third wall and is movable about the second connecting portion. The inner housing is positioned within the accommodation room of the main body. The inner housing has an accommodation room defined by a fifth wall, a sixth wall, a seventh wall and an eighth wall, wherein the fifth wall faces the seventh wall and connects with the sixth and eighth walls. The accommodation room of the inner housing has opposing third and fourth openings in the axial direction, wherein the third opening is configured to allow a second optical fiber connector to insert into the accommodation room of the inner housing. The first shutter member is coupled to the first driving portion, wherein the first driving portion is configured to force the first shutter member away from the third wall. The second shutter member is coupled to the second driving portion, wherein the second driving portion is configured to force the second shutter member away from the first wall. The insertion of the first optical fiber connector from the second opening is configured to push the first shutter member and the first driving portion to move toward the third wall, and to push the second shutter member and the second driving portion to move toward the first wall.

The foregoing, as well as additional objects, features and advantages of the disclosure will be more readily apparent from the following detailed description, which proceeds with reference to the accompanying drawings.

BRIEF DESCRIPTION OF THE DRAWINGS

FIG. 6e is a cross-sectional view taken along line A-A of FIG. 6a.

FIG. 6f is a cross-sectional view taken along line B-B of FIG. 6a.

FIGS. 16 and 17 illustrate how to use the optical fiber adapter of the present disclosure to couple two optical fiber connectors together.

DETAILED DESCRIPTION OF THE PREFERRED EMBODIMENT

Figure 1:
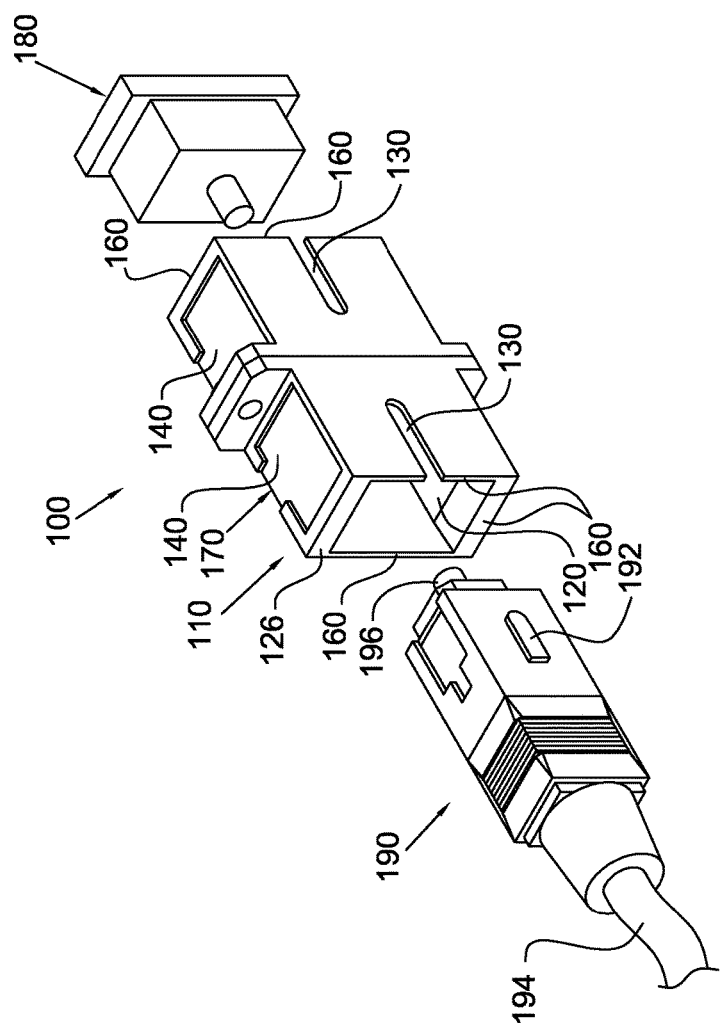
FIG. 1 is an elevated perspective view illustrating a conventional optical fiber adapter and a conventional optical fiber connector.
Figure 2:
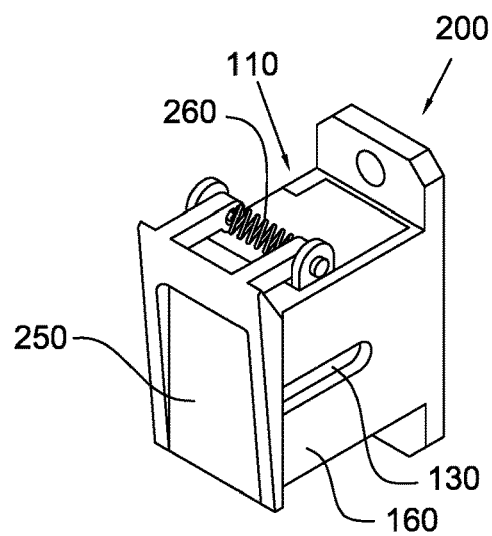
FIG. 2 is an elevated perspective view of a conventional optical fiber adapter with a cover for obstructing the light beams emitting from the receiving recess.
Figure 3:
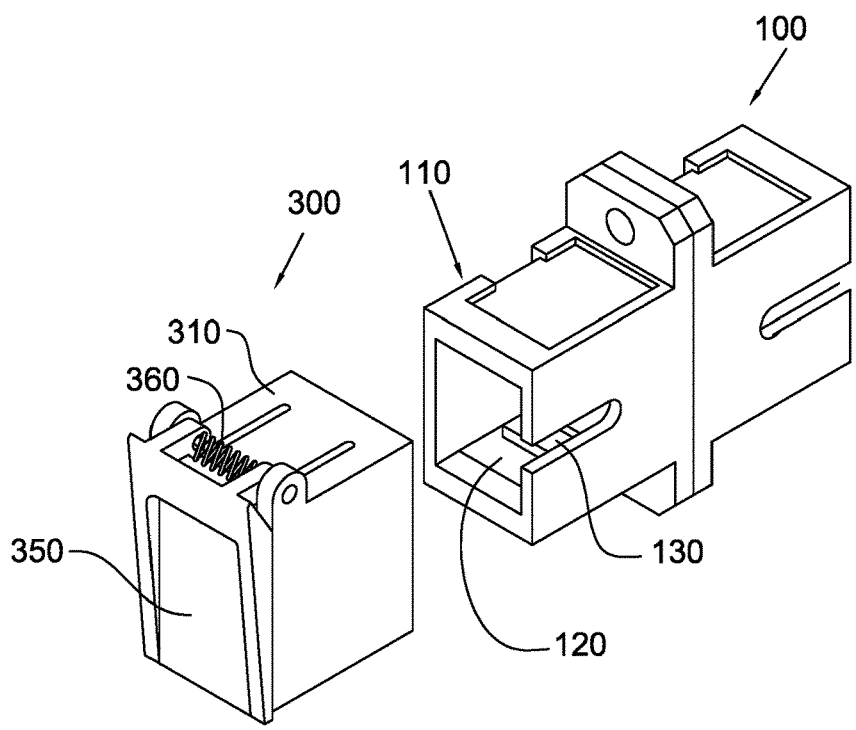
FIG. 3 is an elevated perspective view of a conventional protection cap for an optical fiber adapter.
Figure 4A:
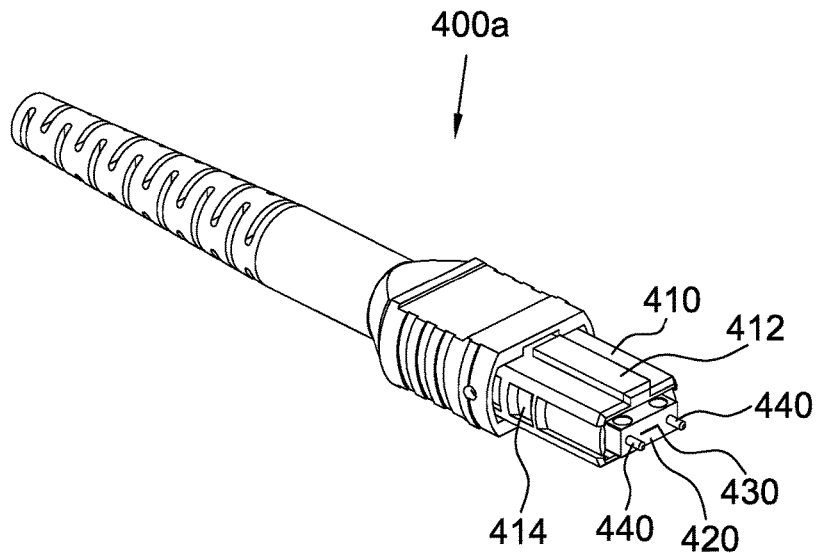
FIG. 4a is an elevated perspective view of a conventional MPO male type optical fiber connector.
Figure 4B:
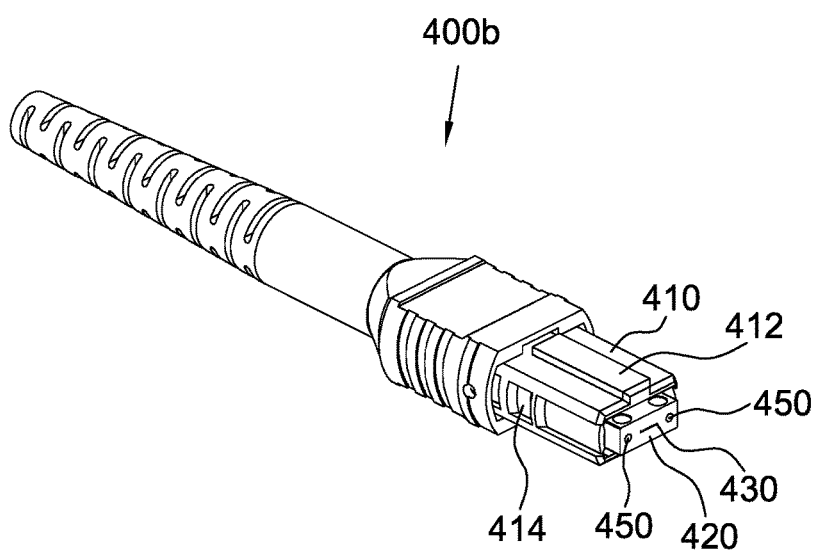
FIG. 4b is an elevated perspective view of a conventional MPO female type optical fiber connector.

Reference is made to FIGS. 4a and 4b, which respectively illustrate conventional multi-fiber MPO male and female type optical fiber connectors 400a and 400b. The respective optical fiber connectors 400a and 400b have a rectangular key protrusion 412 formed on the upper surface of the front section thereof. Located on two opposing lateral surfaces of the front section are two recesses 414. A plurality of optical fibers 430 is exposed from and coplanar with the front end surface 420 of the front section. Two guide pins 440 protrude from the end surface 420 of the optical fiber connector 400a while two guide holes 450 are formed within the end surface 420 of the optical fiber connector 400b to respectively receive the guide pins 440 of the connector 400a.

Figure 5:
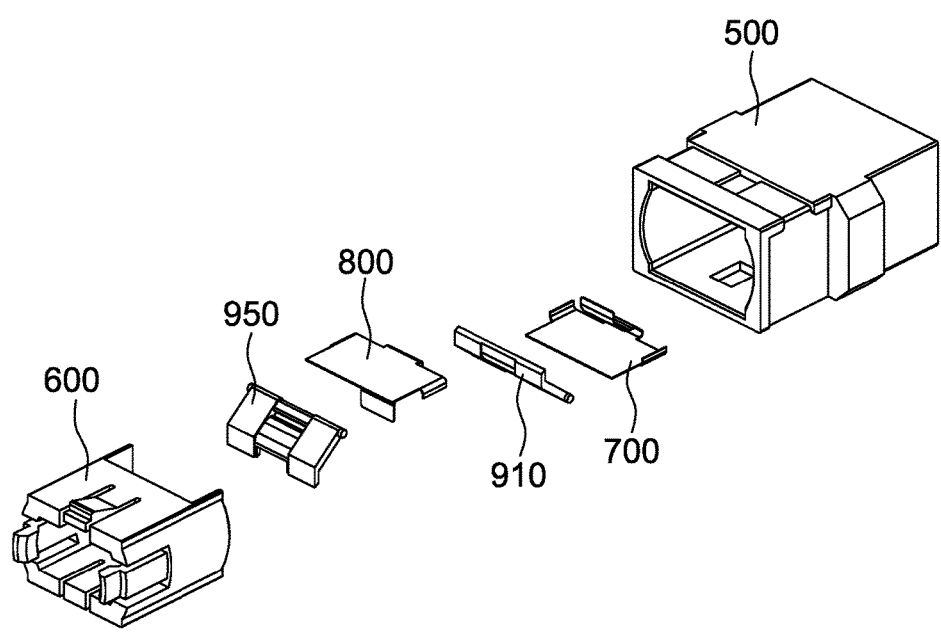
FIG. 5 is an exploded view of the optical fiber adapter of the present disclosure.
Figure 6A:
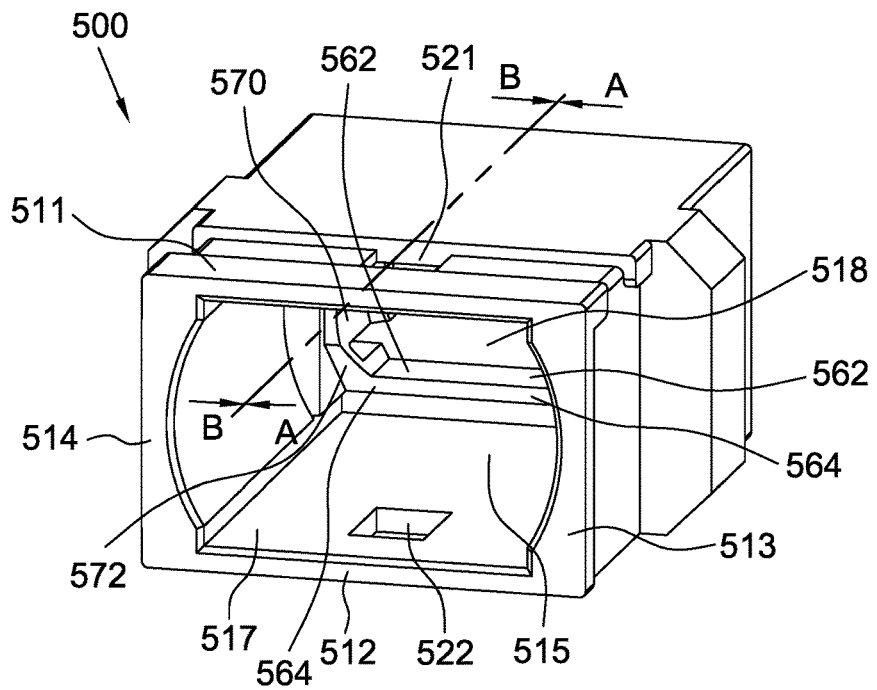
FIGS. 6a to 6d are different elevated perspective views of the main body of the optical fiber adapter of the present disclosure.
Figure 6B:
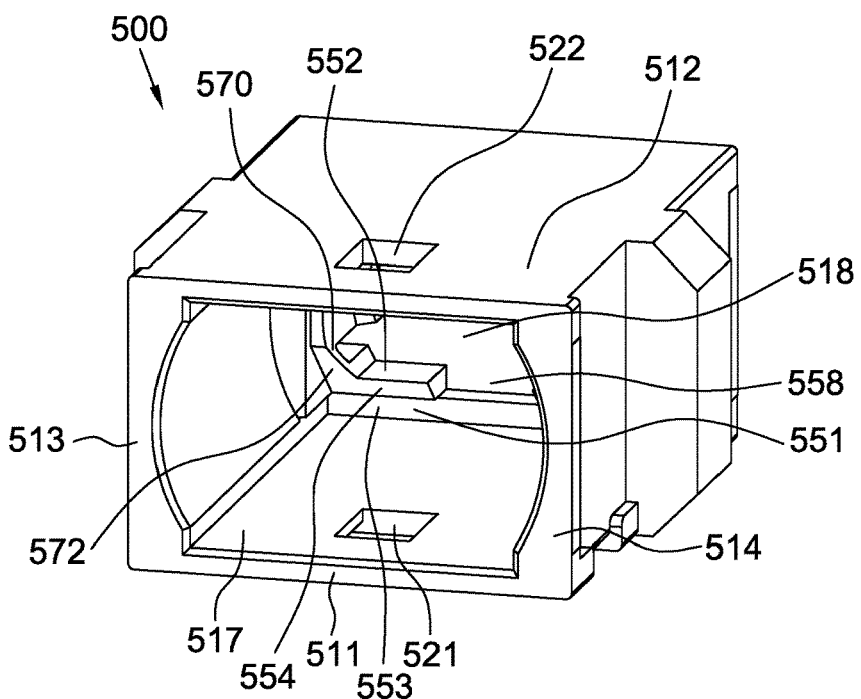
Figure 6C:
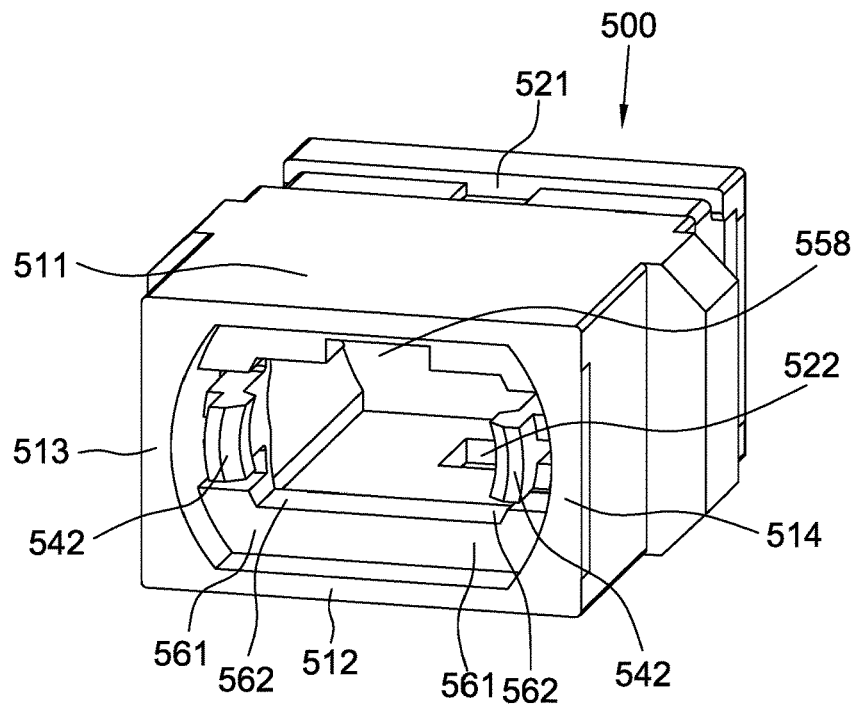
Figure 6D:
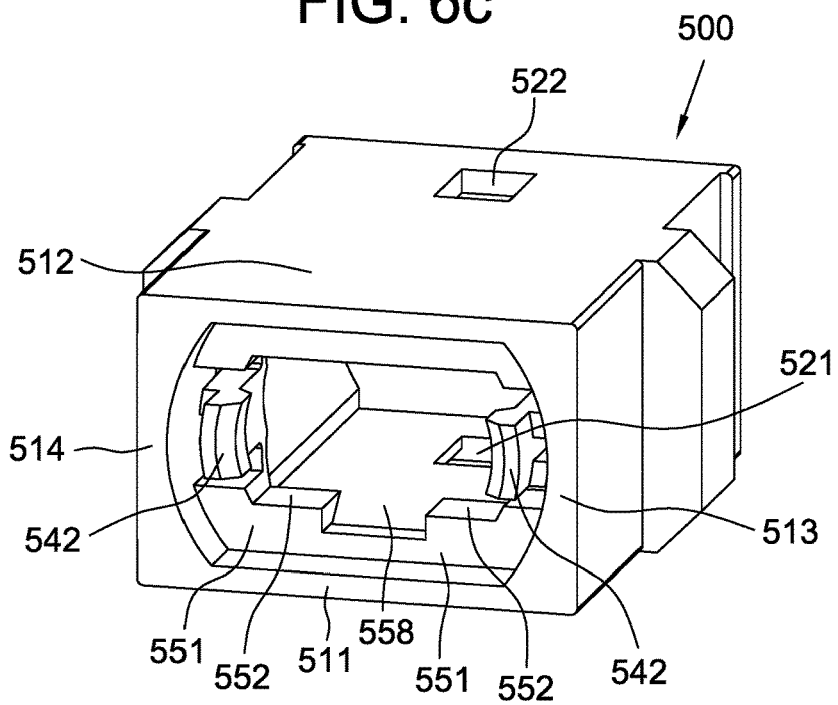
Figure 6E:
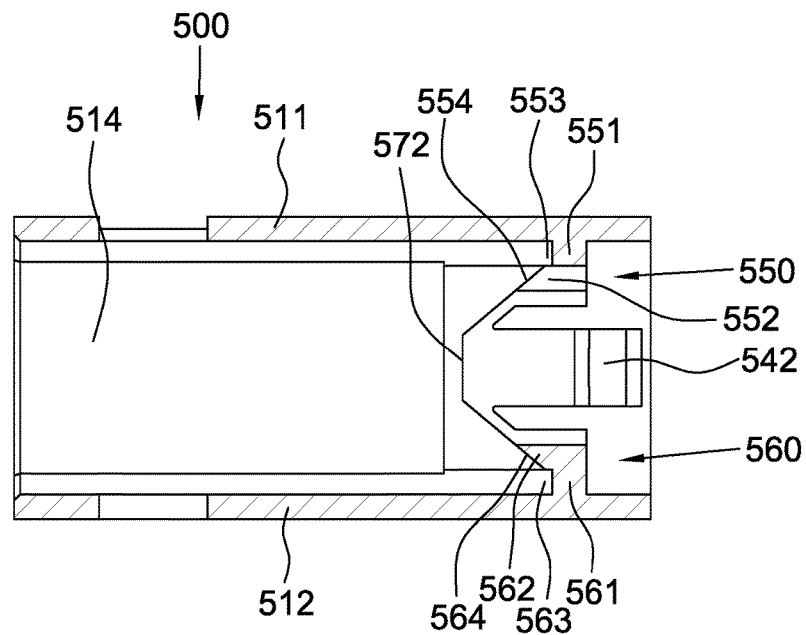
Figure 6F:
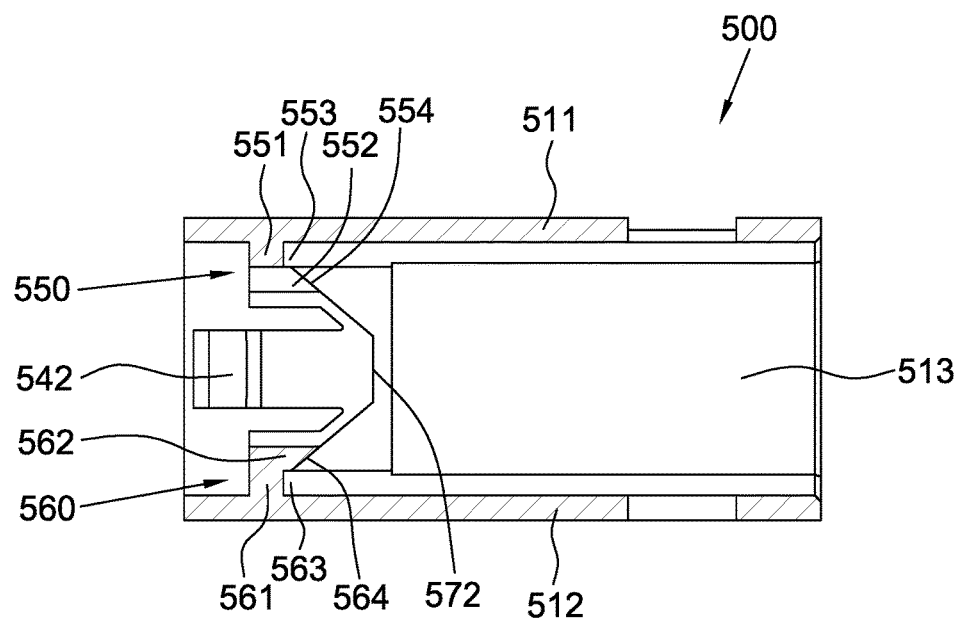
Figure 6G:
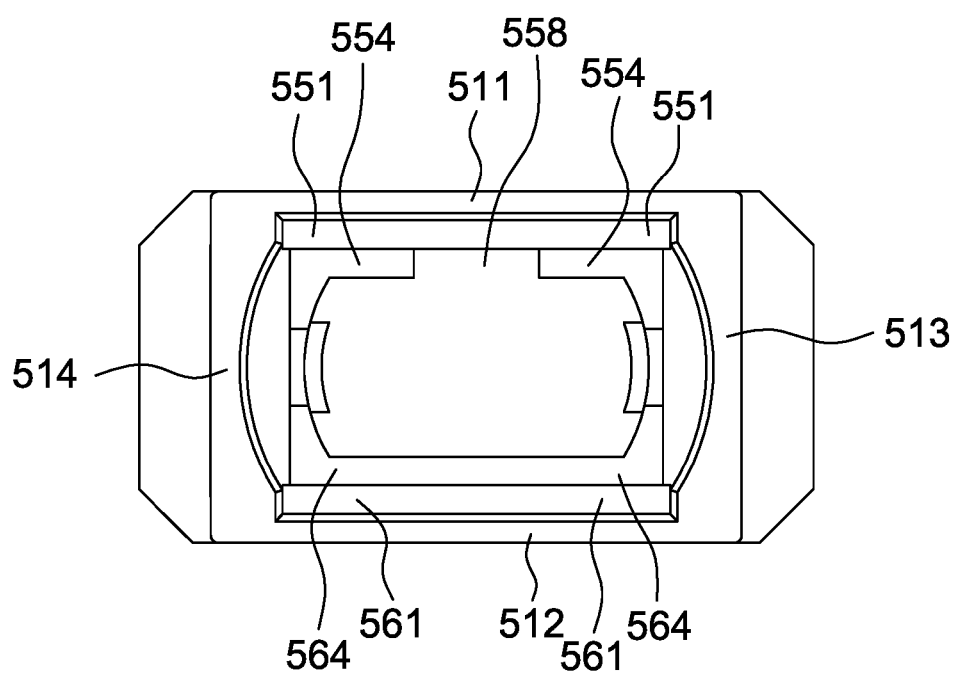
FIG. 6g is a front view of the main body of the optical fiber adapter of the present disclosure.
Figure 7A:
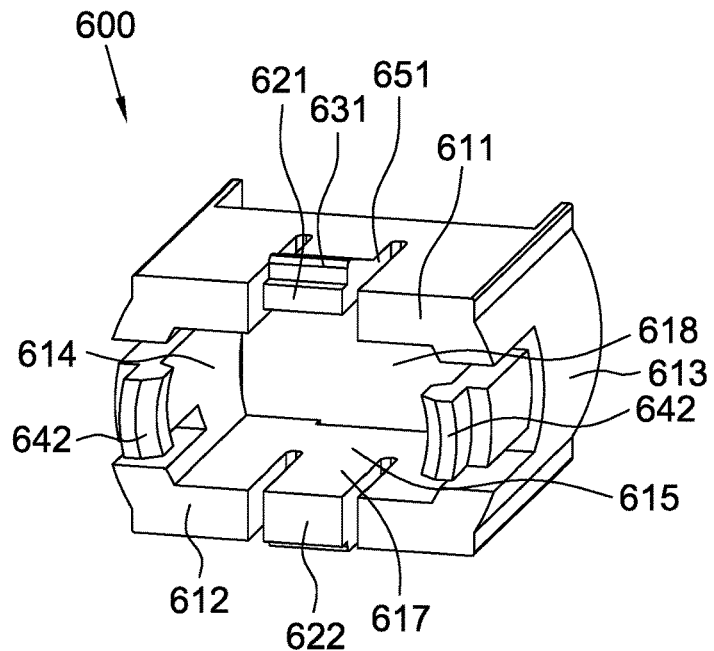
FIGS. 7a to 7d are different elevated perspective views of the inner housing of the optical fiber adapter of the present disclosure.
Figure 7B:
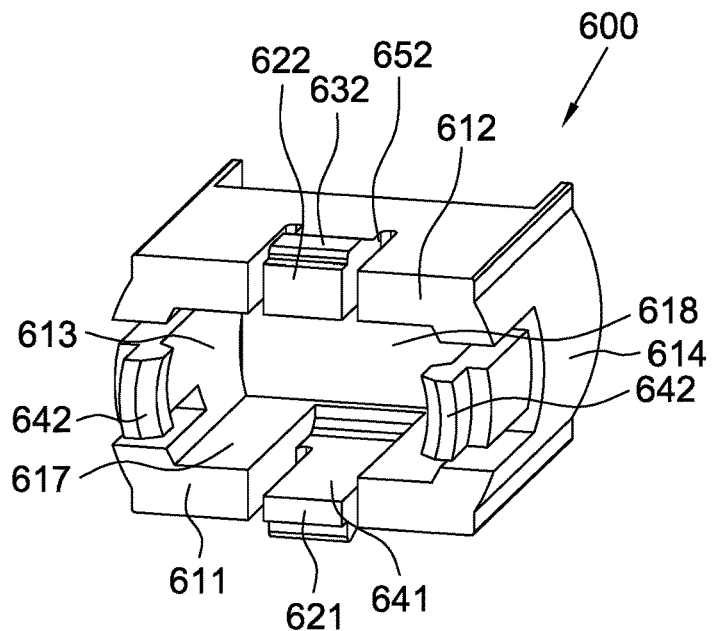
Figure 7C:
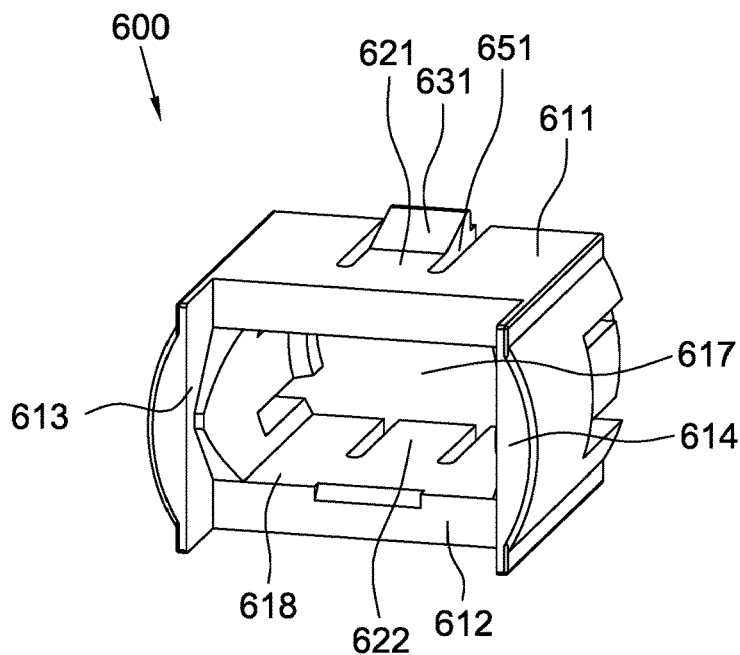
Figure 7D:
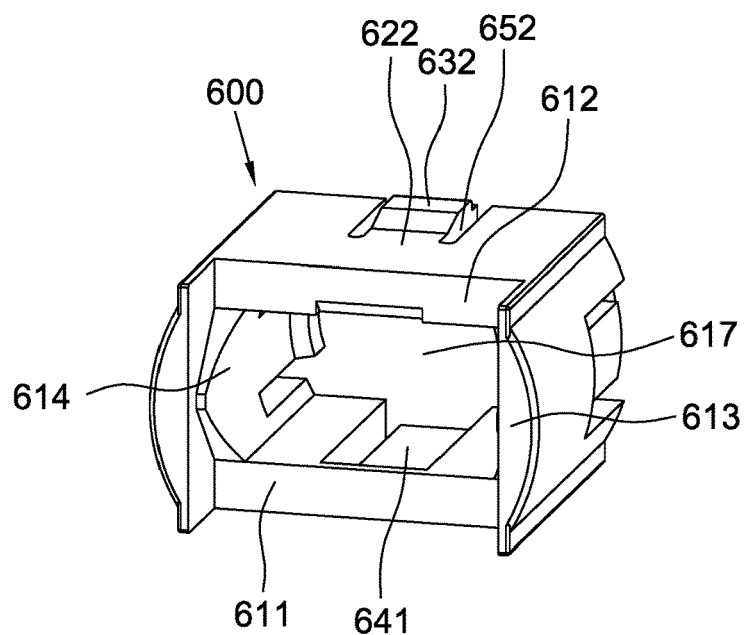

Reference is made to FIG. 5, the optical fiber adapter according to the present disclosure may be an MPO type optical fiber adapter and includes a main body 500, an inner housing 600, a first elastic member 700, a second elastic member 800, a first shutter member 910 and a second shutter member 950.

Reference is now made to FIGS. 6a to 6g, which illustrate the main body 500 of the present disclosure. The main body 500 may be constructed of plastics by an injection molding process. The main body 500 is hollow and substantially has a rectangular shape in cross section. The main body 500 has an accommodation room 515 defined by a top wall 511, a bottom wall 512, a right wall 513 and a left wall 514, wherein the top wall 511 faces the bottom wall 512 and connects with the right wall 513 and left wall 514. The accommodation room 515 has a first opening 517 and an opposed second opening 518 in a lengthwise or axial direction. The top wall 511 is formed with a rectangular opening 521 located near the first opening 517. Similarly, the bottom wall 512 is formed with a rectangular opening 522 located near the first opening 517. In one embodiment, the openings 521 and 522 are through holes. A hook 542 is formed on each of the right and left walls 513, 514. The two hooks 542 are positioned to face each other and extend in the axial direction toward the second opening 518. At least one stop block 550 is formed on the top wall 511 within the accommodation room 515 near the second opening 518. The stop block 550 includes a vertical portion 551 protruding transversely from the top wall 511 and a horizontal portion 552 protruding transversely from the vertical portion 551 toward the first opening 517. Therefore, the stop block 550 has an L-shaped cross section. A room 553 is defined between the stop block 550 and the top wall 511 accordingly. The room 553 has an opening facing the first opening 517. An inclined contact-surface 554 is formed on the rear end of the horizontal portion 552. The contact surface 554 is arranged to face the top wall 511 and the first opening 517. In one embodiment, there are two stop blocks 550 formed on the top wall 511, wherein one of the stop blocks 550 is located near the right wall 513 and the other stop block 550 is located near the left wall 514. The two stop blocks 550 may extend toward each other and connect together to form a continuous stop block 550. However, a break 558 is formed in the continuous horizontal portion 551 and has a width slightly greater than that of the key protrusion 412 on the optical fiber connector 400*a* or 400*b* for the key protrusion 412 to pass therethrough when the optical fiber connector 400*a* or 400*b* is inserted into the accommodation room 515 from the second opening 518. Similarly, at least one stop block 560 is formed on the bottom wall 512 within the accommodation room 515 near the second opening 518. The stop block 560 includes a vertical portion 561 protruding transversely from the bottom wall 512 and a horizontal portion 562 protruding transversely from the vertical portion 561 toward the first opening 517. Therefore, the stop block 560 has an L-shaped cross section. A room 563 is defined between the stop block 560 and the bottom wall 512 accordingly. The room 563 has an opening facing the first opening 517. An inclined contact-surface 564 is formed on the rear end of the horizontal portion 562. The contact surface 564 is arranged to face the bottom wall 512 and the first opening 517. In one embodiment, there are two stop blocks 560 formed on the bottom wall 512, wherein one of the stop blocks 560 is located near the right wall 513 and the other stop block 560 is located near the left wall 514. The two stop blocks 560 may extend toward each other and connect together to form a continuous stop block 560. In addition, each of the right wall 513 and the left wall 514 is provided with a protrusion 570 formed thereon. The respective protrusions 570 have an inclined contact-surface 572 formed on an outer surface thereof to face the first opening 517.

Reference is now made to FIGS. 7*a* to 7*d*, which illustrates the inner housing 600 of the present disclosure. The inner housing 600 may be constructed of plastics by an injection molding process. The inner housing 600 is hollow and substantially has a rectangular shape in cross section. The inner housing 600 has an accommodation room 615 defined by a top wall 611, a bottom wall 612, a right wall 613 and a left wall 614, wherein the top wall 611 faces the bottom wall 612 and connects with the right wall 613 and left wall 614. The accommodation room 615 has a third opening 617 and an opposed fourth opening 618 in the lengthwise or axial direction. A hook 642 is formed on each of the right and left walls 613, 614. The two hooks 642 are positioned to face each other and extend in the axial direction toward the third opening 617. The top wall 611 is formed with a slot extending in the axial direction and the slot defines a rectangular break 651. An arm 621 is formed within the break 651 and protrudes in the axial direction from the top wall 611 toward the third opening 617. The arm 621 has a root coupled to the top wall 611 accordingly. The bottom wall 612 is also formed with a slot extending in the axial direction and the slot defines a rectangular break 652. An arm 622 is formed within the break 652 and protrudes in the axial direction from the bottom wall 612 toward the third opening 617. The arm 622 has a root coupled to the bottom wall 612 accordingly. Engagement protrusions 631 and 632 are respectively formed outside the accommodation room 615 on the arms 621 and 622. The engagement protrusions 631 and 632 define respective angled or ramped outer surfaces that are sloped down toward the roots of the respective arms 621 and 622. A rectangular recess 641 extending in the axial direction is formed within the top wall 611 in the accommodation room 615. In one embodiment, the arm 621 defines a bottom of the recess 641. The recess 641 has a width slightly greater than that of the key protrusion 412 on the optical fiber connector 400*a* or 400*b* so as to receive the key protrusion 412 when the optical fiber connector 400*a* or 400*b* is inserted into the accommodation room 615 from the third opening 617.

Figure 8A:
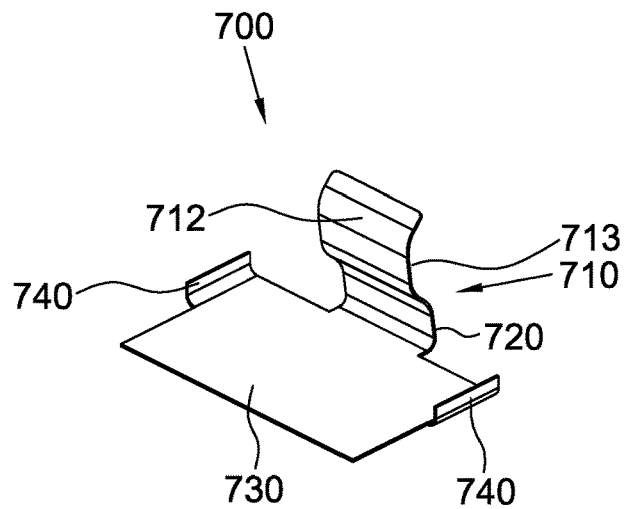
FIGS. 8a and 8b are different elevated perspective views of the first elastic member of the optical fiber adapter of the present disclosure.
Figure 8B:
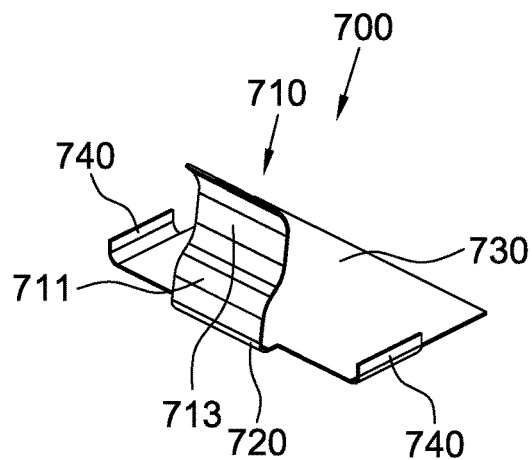
Figure 8C:
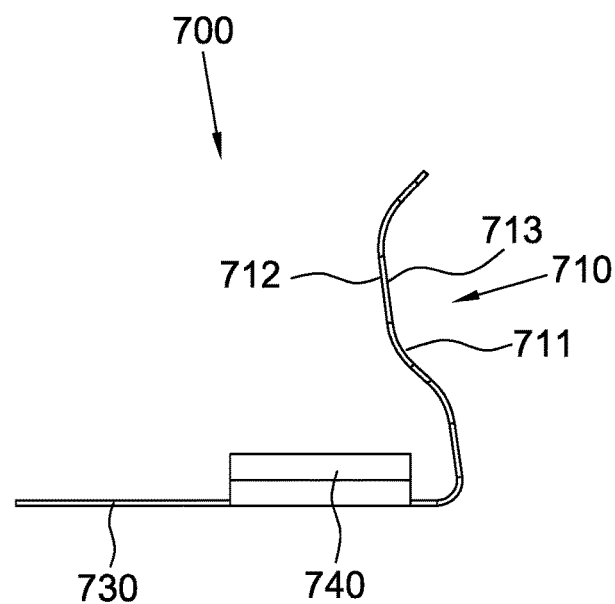
FIG. 8c is a side view of the first elastic member of the optical fiber adapter of the present disclosure.
Figure 9A:
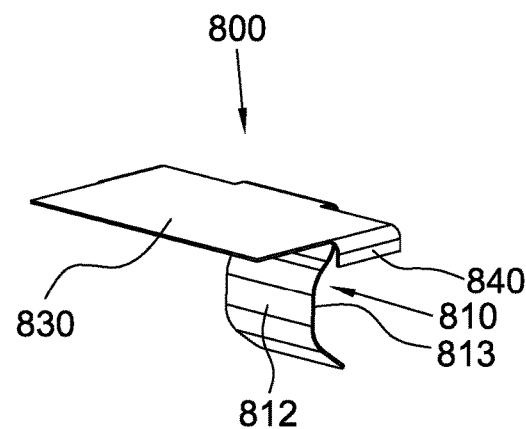
FIGS. 9a to 9c are different elevated perspective views of the second elastic member of the optical fiber adapter of the present disclosure.
Figure 9B:
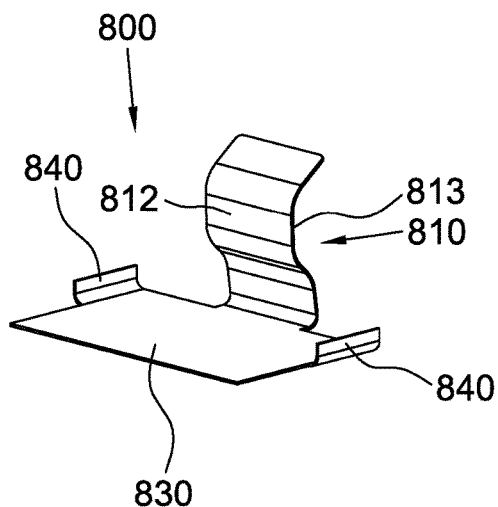
Figure 9C:
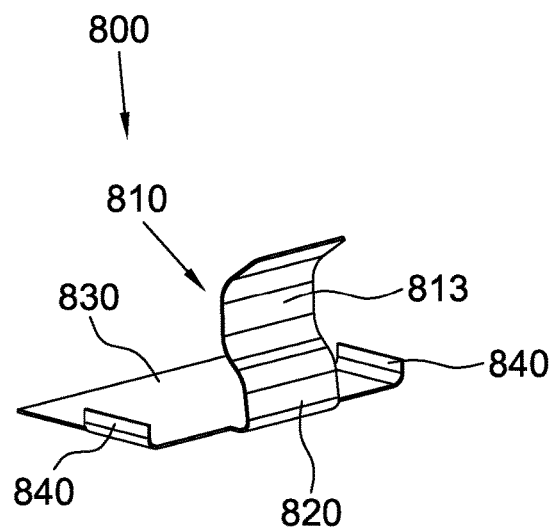
Figure 9D:
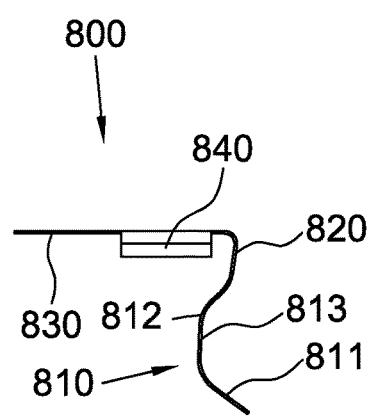
FIG. 9d is a side view of the second elastic member of the optical fiber adapter of the present disclosure.

Reference is now made to FIGS. 8*a* to 8*c*, which illustrates the first elastic member 700 of the present disclosure. The first elastic member 700 is elastic and integrally formed with a metal sheet. The first elastic member 700 includes a driving portion 710, a connecting portion 720, a base portion 730 and two flaps 740. The connecting portion 720 is substantially L-shaped in cross section and connects the base portion 730 with the driving portion 710. The driving portion 710 is curved and extends out from the connecting portion 720. The driving portion 710 has a front surface 711 and an opposed back surface 712, wherein the back surface 712 may be moved to face the base portion 730 and a concave surface 713 is formed on the front surface 711. The driving portion 710 may be pivotally moved about the connecting portion 720 toward the base portion 730. The driving portion 710 is bent close to the base portion 730 with a push force exerting on the front surface 711 and quickly moves back to its an original position when the push force is withdrawn. The connecting portion 720 will deform when the driving portion 710 is moved close to the base portion 730. The base portion 730 includes a rectangular plate and the connecting portion 720 extends out from the front side of the base portion 730. The two flaps 740 protrude upward from the right side and left side of the base portion 730, respectively.

Reference is now made to FIGS. 9*a* to 9*d* which illustrates the second elastic member 800 of the present disclosure. The second elastic member 800 is elastic and integrally formed with a metal sheet. The second elastic member 800 includes a driving portion 810, a connecting portion 820, a base portion 830 and two flaps 840. The connecting portion 820 is substantially L-shaped in cross section and connects the base portion 830 with the driving portion 810. The driving portion 810 is curved and extends out from the connecting portion 820. The driving portion 810 has a front surface 811 and an opposed back surface 812, wherein the back surface 812 may be moved to face the base portion 830 and a concave surface 813 is formed on the front surface 811. The driving portion 810 may be pivotally moved about the connecting portion 820 toward the base portion 830. The driving portion 810 is bent close to the base portion 830 with a push force exerting on the front surface 811 and quickly moves back to its an original position when the push force is withdrawn. The connecting portion 820 will deform when the driving portion 810 is moved close to the base portion 830. The base portion 830 includes a rectangular plate and the connecting portion 820 extends out from the front side of the base portion 830. The two flaps 840 protrude upward from the right side and left side of the base portion 830, respectively.

Figure 10A:
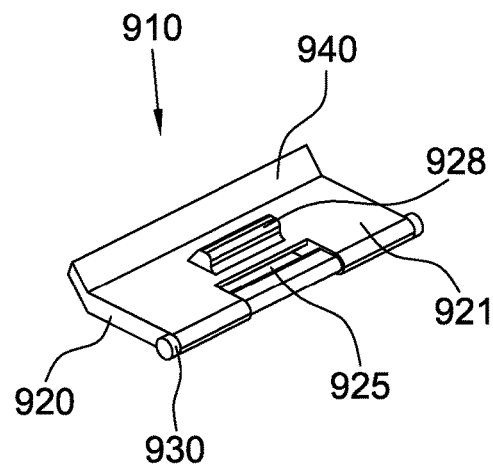
FIGS. 10a and 10b are different elevated perspective views of the first shutter member of the optical fiber adapter of the present disclosure.
Figure 10B:
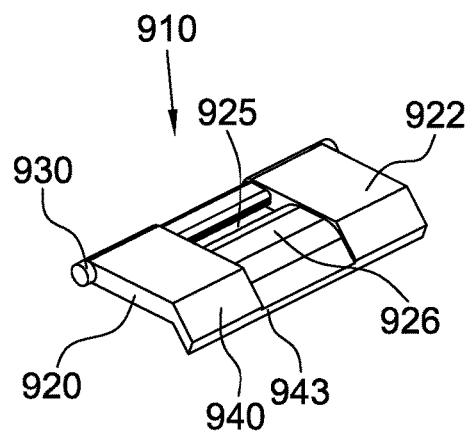

Reference is now made to FIGS. 10a and 10b, which illustrates the first shutter member 910 of the present disclosure. The first shutter member 910 may be constructed of plastics by an injection molding process. The first shutter member 910 includes a rectangular shutter plate 920 that has a front surface 921 and an opposed back surface 922. A pivotal axis 930 is formed at the front side of the shutter plate 920 and an extending portion 940 extends out from the rear side of the shutter plate 920 at an angle between 90 and 180 degrees. The extending portion 940 has an inclined surface 943 formed on the rear side thereof. A slot 925 extending transversely is formed within the shutter plate 920 and has a length slightly greater than the width of the driving portion 710 of the first elastic member 700. A wedge-shaped contact projection 928 extending transversely is formed on the front surface 921 of the shutter plate 920 and between the slot 925 and the extending portion 940. In addition, a recess 926 is formed on the back surface 922 of the shutter plate 920 and continuously extends from the slot 925 to the inclined surface 943 of the extending portion 940. The recess 926 has a width slightly greater than that of the driving portion 710 of the first elastic member 700. The recess 926 has a bottom with a shape fit to the curvature of the driving portion 710.

Figure 11A:
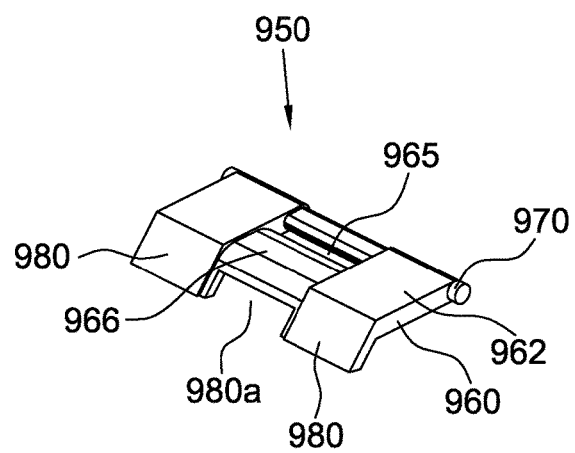
FIGS. 11a and 11b are different elevated perspective views of the second shutter member of the optical fiber adapter of the present disclosure.
Figure 11B:
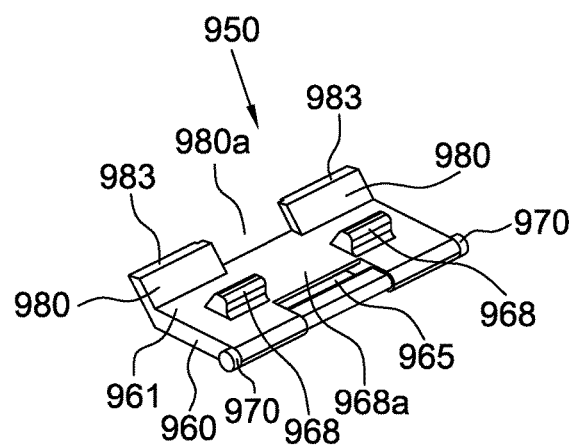

Reference is now made to FIGS. 11a and 11b, which illustrates the second shutter member 950 of the present disclosure. The second shutter member 950 may be constructed of plastics by an injection molding process. The second shutter member 950 includes a rectangular shutter plate 960 that has a front surface 961 and an opposed back surface 962. A pivotal axis 970 is formed at the front side of the shutter plate 960 and an extending portion 980 extends out from the rear side of the shutter plate 960 at an angle between 90 and 180 degrees. The extending portion 980 has an inclined surface 983 formed on the rear side thereof. A break 980a is formed in the extending portion 980 such that the extending portion 980 is divided into right and left halves. The break 980a is configured for the key protrusion 412 on the optical fiber connector 400a or 400b to pass therethrough and therefore has a width slightly greater than that of the key protrusion 412. A slot 965 extending transversely is formed within the shutter plate 960 and has a length slightly greater than the width of the driving portion 810 of the second elastic member 800. A wedge-shaped contact projection 968 extending transversely is formed on the front surface 961 of the shutter plate 960 and between the slot 965 and the extending portion 980. A break 968a is formed in the contact projection 968 such that the contact projection 968 is divided into right and left halves. The break 968a is configured for the key protrusion 412 on the optical fiber connector 400a or 400b to pass therethrough and therefore has a width slightly greater than that of the key protrusion 412. In addition, a recess 966 is formed on the back surface 962 of the shutter plate 960 and continuously extends from the slot 965 to the break 980a. The recess 966 has a width slightly greater than that of the driving portion 810 of the second elastic member 800. The recess 966 has a bottom with a shape fit to the curvature of the driving portion 810.

Figure 12:
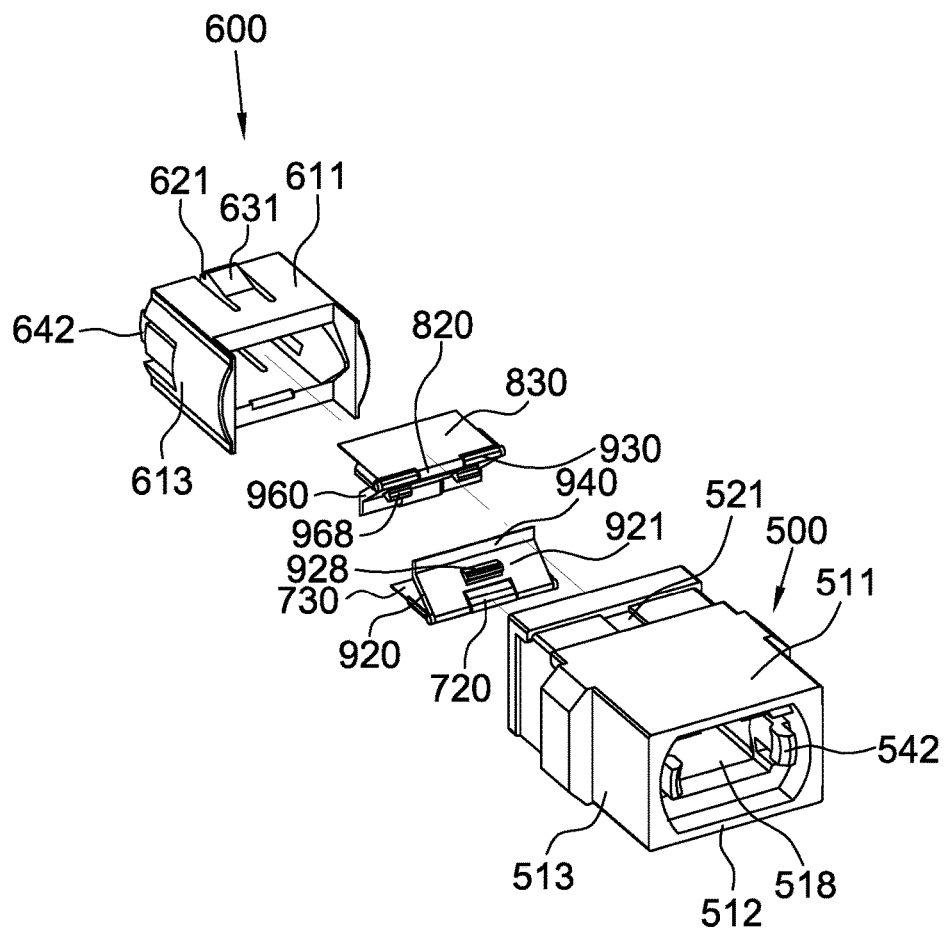
FIG. 12 illustrates how to assemble the optical fiber adapter of the present disclosure.

Reference is made to FIG. 12, when preparing to assemble the optical fiber adapter of the present disclosure, the first shutter member 910 and the second shutter member 950 are respectively coupled to the first elastic member 700 and the second elastic member 800. The way to couple the first shutter member 910 to the first elastic member 700 is to position the back surface 922 of the shutter plate 920 to face the base portion 730 of the first elastic member 700 and then to move the pivotal axis 930 of the first shutter member 910 to the bend of the L-shaped connecting portion 720 of the first elastic member 700. Afterward, the driving portion 710 of the first elastic member 700 is inserted through the slot 925 of the first shutter member 910 and then the front surface 711 of the driving portion 710 is attached to the bottom of the recess 926 of the first shutter member 910. Similarly, the way to couple the second shutter member 950 to the second elastic member 800 is to position the back surface 962 of the shutter plate 960 to face the base portion 830 of the second elastic member 800 and then to move the pivotal axis 970 of the second shutter member 950 to the bend of the L-shaped connecting portion 820 of the second elastic member 800. Afterward, the driving portion 810 of the second elastic member 800 is inserted through the slot 965 of the second shutter member 950 and then the front surface 811 of the driving portion 810 is attached to the bottom of the recess 966 of the second shutter member 950. At this state the rear end of the driving portion 810 will protrude outside the extending portion 980 from the break 980a.

Subsequently, the assembly of the first elastic member 700 and first shutter member 910 is inserted into the main body 500 from the first opening 517 in such a manner that the connecting portion 720 is headed toward the stop block 560 and then moved into the room 563. After the connecting portion 720 has come within the room 563, the base portion 730 will position on the bottom wall 512 of the main body 500 and the back surface 712 of the driving portion 710 will face the first opening 517. At this state the front surface 921 of the shutter plate 920 will face the second opening 518 of the main body 500 and the inclined surface 943 of the extending portion 940 will face the top wall 511. Furthermore, the two flaps 740 respectively press upon the right wall 513 and the left wall 514. After the assembly of the first elastic member 700 and first shutter member 910 comes in position within the main body 500, the assembly of the second elastic member 800 and second shutter member 950 is then inserted into the main body 500 from the first opening 517 in such a manner that the connecting portion 820 is headed toward the stop block 550 and then moved into the room 553. After the connecting portion 820 has come within the room 553, the base portion 830 will position on the top wall 511 of the main body 500 and the back surface 812 of the driving portion 810 will face the first opening 517. At this state the front surface 961 of the shutter plate 960 will face the second opening 518 of the main body 500 and the inclined surface 983 of the extending portion 980 will face the inclined surface 943 of the extending portion 940. The rear end of the front surface 811 of the driving portion 810 will press upon the extending portion 940. Furthermore, the two flaps 840 respectively press upon the right wall 513 and the left wall 514.

Figure 13:
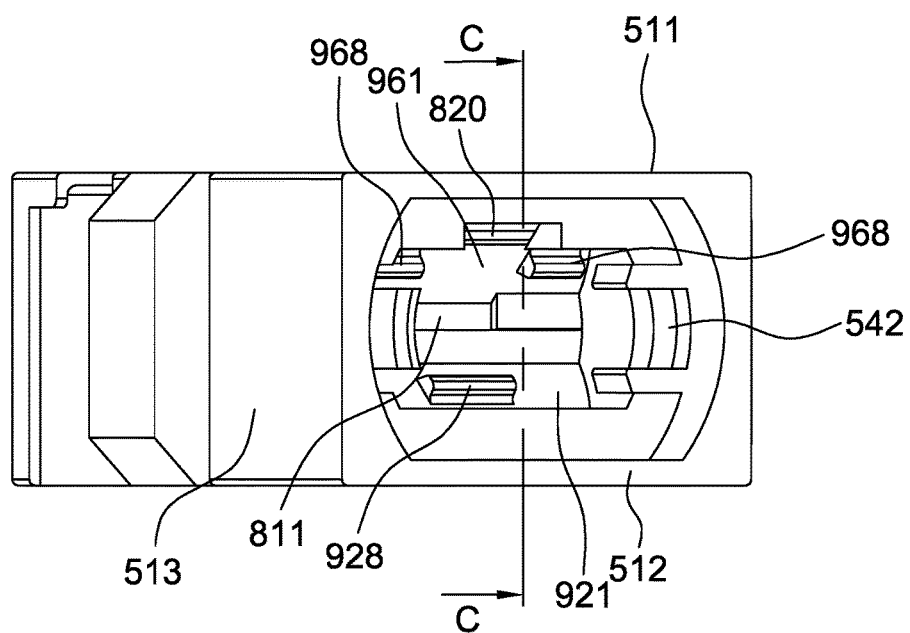
FIG. 13 is an elevated perspective view of the optical fiber adapter of the present disclosure.
Figure 14:
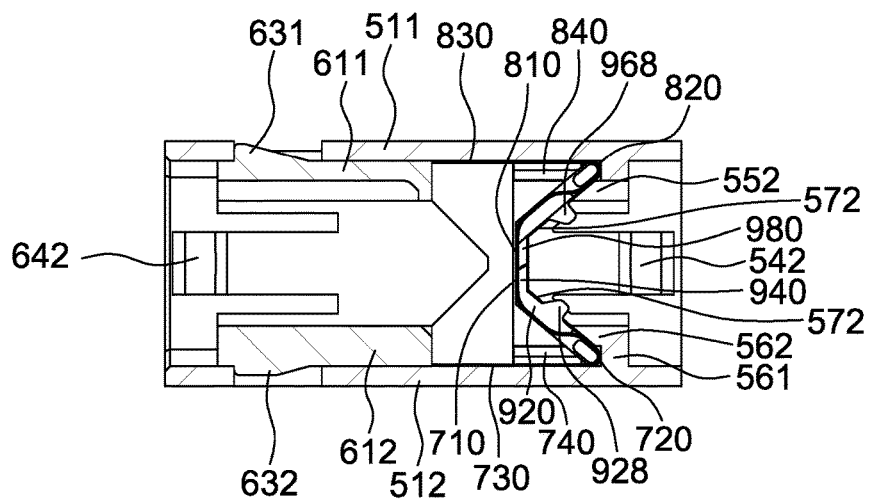
FIG. 14 is a cross-sectional view taken along line C-C of FIG. 13.

Finally, the inner housing 600 is inserted into the main body 500 from the first opening 517 with the hooks 642 thereof being positioned backward to the second opening 518 of the main body 500. In the optical fiber adapter of the present disclosure the inner housing 600 may be inserted into the main body 500 such that the top wall 611 and bottom wall 612 of the inner housing 600 come to being positioned to directly face the top wall 511 and bottom wall 512 of the main body 500 respectively. Alternatively, the top wall 611 and the bottom wall 612 may be positioned to directly face the bottom wall 512 and top wall 511 of the main body 500 respectively. In the assembling method illustrated in FIG. 12, the top wall 611 and bottom wall 612 of the inner housing 600 will directly face the top wall 511 and bottom wall 512 of the main body 500 respectively when the inner housing 600 has been inserted into the main body 500. When the inner housing 600 is pushed into the main body 500, the engagement protrusions 631 and 632 will slide on the top and bottom walls 511, 512 respectively and therefore bend the arms 621 and 622. When the inner housing 600 continues to be pushed into the main body 500 such that the engagement protrusions 631, 632 fall into the openings 521, 522 respectively, the arms 621 and 622 spring up and the assembling of the optical fiber adapter of the present disclosure is finished. At this state the rear sides of the bottom wall 612 and top wall 611 of the inner housing 600 respectively press upon the rear sides of the base portions 730, 830 to push the connecting portions 720 and 820 further into the rooms 563 and 553 respectively. FIGS. 13 and 14 illustrate the assembled optical fiber adapter of the present disclosure.

Figure 15:
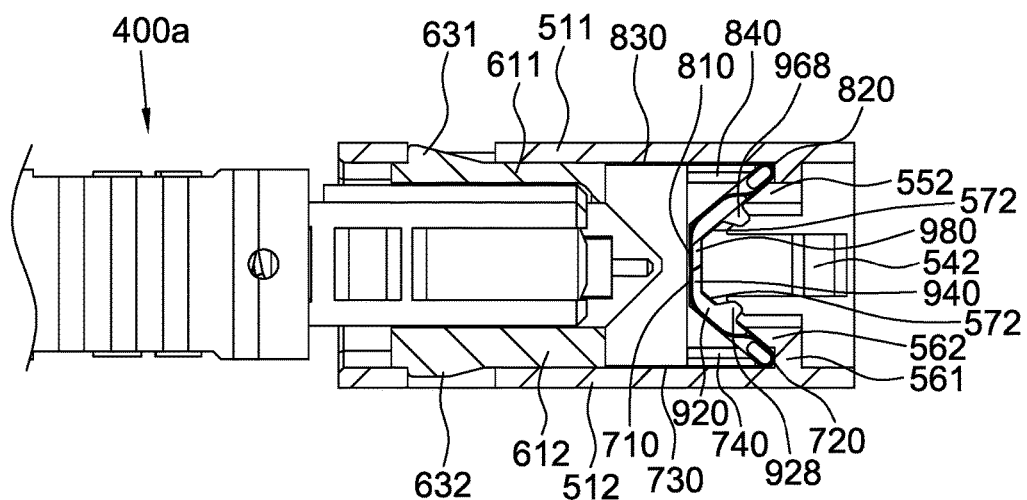
FIG. 15 illustrates the operation principles of the first and second shutter members of the optical fiber adapter of the present disclosure.

Reference is made to FIG. 15, when no one optical fiber connector is inserted into the main body 500 from the second opening 518, the first and second driving portions 710, 810 will spring up as a result of elasticity. Simultaneously, the driving portions 710 and 810 will respectively raise the shutter members 910 and 950. When an optical fiber connector 400a of FIG. 4a is inserted into the inner housing 600 from the third opening 617, the light beams emitting out from the optical fibers 430 of the optical fiber connector 400a will be obstructed by the raised shutter members 910 and 950. Consequently, the occurrence of exposure to the harmful light beams may be avoided. In addition, the edges of the shutter plates 920, 960 and extending portions 940, 980 come in contiguous contact with the contact surfaces 572 of the protrusions 570 on the right and left walls 513, 514 of the main body 500. This further prevents the inserted optical fiber connector 400a from contamination that has come from the second opening 518 into the main body 500.

Reference is made to FIGS. 16 and 17, an optical fiber connector 400b of FIG. 4b may be inserted into the main body 500 from the second opening 518 such that the key protrusion 412 thereof is passed through the break 558 in the continuous stop block 550. A lower portion and an upper portion of the optical fiber connector 400b will respectively come in contact with the contact projection 928 of the first shutter member 910 and the contact projection 968 of the second shutter member 950. The shutter members 910 and 950 are then pushed to swing toward the bottom and top walls 512, 511 of the main body 500 respectively. Simultaneously, the driving portions 710 and 810 are also lowered down. When the optical fiber connector 400b continues to be pushed into the main body 500, the key protrusion 412 will pass through the break 968a and the break 980a and finally come in direct contact with the rear end of the driving portion 810.

When the optical fiber connector 400b is fully inserted into the main body 500, the hooks 542 of the main body 500 respectively hook on to the recesses 414 on the optical fiber connector 400b. The guide pins 440 of the optical fiber connector 400a are respectively inserted into the guide holes 450 on the optical fiber connector 400b and the optical fibers 430 exposed out from the optical fiber connector 400a and 400b come in direct contact with each other so that the light beam coming from one fiber may be optically coupled to the coupled fiber. When the optical fiber connectors 400a and 400b come in optical contact with each other, the first shutter member 910 and the driving portion 710 are pushed to being positioned between the bottom wall 512 of the main body 500 and the optical fiber connector 400b, and the second shutter member 950 and the driving portion 810 are pushed to being positioned between the top wall 511 of the main body 500 and the optical fiber connector 400b. Upon pulling out the optical fiber connector 400b from the main body 500, the pressed driving portions 710 and 810 will quickly spring up as a result of elasticity and therefore bring the shutter members 910 and 950 back to respective original positions to obstruct the emitting light beams from the optical fibers 430 of the optical fiber connector 400a again. As a result, the occurrence of exposure to the harmful light beams may be avoided.

In the optical fiber adapter of the present disclosure the engagement protrusions 631, 632 of the inner housing 600 respectively fall into the openings 521, 522 on the top and bottom walls 511 and 512 to prevent the inner housing 600 from being pulled out of the main body 500 from the first opening 517. The recess 641 of the inner housing 600 is configured to receive the key protrusion 412 of the optical fiber connector 400a or 400b so that the optical fiber connector 400a, 400b may be inserted into the inner housing 600 with only the predetermined orientation. The coupling polarity of the optical fiber connectors 400a and 400b may be switched by positioning the top and bottom walls 611, 612 of the inner housing 600 to respectively face the top and bottom walls 511, 512 or to respectively face the bottom and top walls 512, 511 of the main body 500 when placing the inner housing 600 within the main body 500. The hooks 542, 642 of the main body 500 and the inner housing 600 are configured to hook on to the recesses 414 on the optical fiber connector 400a or 400b.

Referring to FIGS. 16 and 17 again, there is no need to detach the shutter members 910, 950 and the elastic members 700, 800 from the main body 500 prior to inserting an optical fiber connector 400b into the main body 500 from the second opening 518. When the optical fiber connector 400b is inserted into the main body 500 from the second opening 518, the shutter members 910, 950 and the elastic members 700, 800 are pushed to being close to the bottom wall 512 or the top wall 511. Upon pulling out the optical fiber connector 400b from the main body 500, the pressed driving portions 710 and 810 will quickly spring up as a result of elasticity and therefore bring the shutter members 910 and 950 back to respective original positions. Accordingly, the light beams emitting from the optical fibers 430 of the optical fiber connector 400a may be obstructed again.

In the optical fiber adapter of the present disclosure the flaps 740, 840 of the elastic members 700, 800 are positioned within the main body 500 to press upon the right wall 513 and the left wall 514 so that the transverse movements of the elastic members 700, 800 in the accommodation room 515 may be restricted. The inclined contact surfaces 564, 554 on the horizontal portions 562, 552 of the main body 500 are configured to be in respective contact with the front surfaces 921, 961 of the shutter plates 920, 960 to prevent the shutter members 910, 950 from further swing toward the second opening 518. Furthermore, the second shutter member 950 may be designed to be pushed to swing earlier than the first shutter member 910 by an optical fiber connector inserted from the second opening 518 into the main body 500 so that the first and second shutter members 910, 950 will not interfere with each other.

Besides, when the openings 521, 522 are through holes, elongated objects may be used through the openings 521, 522 to press down the arms 621, 622. This way the inner housing 600 and shutter members 910, 950 may be taken out from the main body 500 through the first opening 517. The stop blocks 550, 560 of the main body 550 are positioned to restrict the further movements of the connecting portions 820, 720 of the shutter members 800, 700 respectively so that the shutter members 950, 910 are not able to be pulled out from the second opening 518.

Although the present disclose has been explained in detail with MPO type optical fiber adapter, it will be appreciated that the optical fiber adapter of the present disclosure may include other types of optical fiber adapters.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter for optically coupling two optical fiber connectors with each other, the optical fiber adapter comprising:
   a main body having an accommodation room defined by a first wall, a second wall, a third wall and a fourth wall, the first wall facing the third wall and connecting with the second and fourth walls, wherein the accommodation room has opposing first and second openings in an axial direction, the second opening is configured to allow a first optical fiber connector to insert into the accommodation room;
   a first elastic member comprising:
      a first base portion positioned on the third wall within the accommodation room;
      a first driving portion; and
      a first connecting portion connecting the first base portion with the first driving portion, wherein the first driving portion extends from the first connecting portion toward the first wall and is movable about the first connecting portion;
   a second elastic member comprising:
      a second base portion positioned on the first wall within the accommodation room;
      a second driving portion; and
      a second connecting portion connecting the second base portion with the second driving portion, wherein the second driving portion extends from the second connecting portion toward the third wall and is movable about the second connecting portion;
   an inner housing positioned within the accommodation room of the main body, the inner housing having an accommodation room defined by a fifth wall, a sixth wall, a seventh wall and an eighth wall, the fifth wall facing the first and seventh walls and connecting with the sixth and eighth walls, wherein the accommodation room of the inner housing has opposing third and fourth openings in the axial direction, the third opening is configured to allow a second optical fiber connector to insert into the accommodation room of the inner housing;
   a first shutter member coupled to the first driving portion, wherein the first driving portion forces the first shutter member away from the third wall; and
   a second shutter member coupled to the second driving portion, wherein the second driving portion forces the second shutter member away from the first wall;
   wherein the insertion of the first optical fiber connector from the second opening is configured to push the first shutter member and the first driving portion to move toward the third wall, and to push the second shutter member and the second driving portion to move toward the first wall.

2. The optical fiber adapter as claimed in claim 1, wherein the first elastic member further comprising:
   two flaps extending transversely from the first base portion to respectively press upon the second wall and the fourth wall.

3. The optical fiber adapter as claimed in claim 1, wherein the main body further comprising:
   two protrusions respectively formed on the second wall and the fourth wall, the each protrusion having a contact surface facing the first opening, the two contact surfaces are configured to be in contact with the first shutter member and the second shutter member.

4. The optical fiber adapter as claimed in claim 1, wherein the first shutter member comprising:
   a shutter plate having opposing front and back surfaces, wherein the first driving portion is attached to the back surface.

5. The optical fiber adapter as claimed in claim 4, wherein a slot is formed within the shutter plate for the first driving portion to pass therethrough.

6. The optical fiber adapter as claimed in claim 4, wherein the first shutter member further comprising:
   a contact projection formed on the front surface of the shutter plate, wherein the contact projection is configured to be in contact with the first optical fiber connector.

7. The optical fiber adapter as claimed in claim 4, wherein the first shutter member further comprising:
   an extending portion extending out from the shutter plate at an angle between 90 and 180 degrees, wherein the first driving portion is further attached to the extending portion.

8. The optical fiber adapter as claimed in claim 7, wherein the first driving portion is further configured to be in contact with the second shutter member.

9. The optical fiber adapter as claimed in claim 1, wherein the seventh wall of the inner housing is configured to push the first base portion, and the fifth wall of the inner housing is configured to push the second base portion.

10. The optical fiber adapter as claimed in claim 1, wherein a fifth opening is formed within the first wall or the third wall, the inner housing further comprising:
   an arm; and
   an engagement protrusion coupled to the arm, wherein the engagement protrusion is positioned in the fifth opening.

11. The optical fiber adapter as claimed in claim 1, further comprising:
   two stop blocks coupled to the main body to respectively restrict the further movements of the first and second connecting portions toward the second opening.

12. The optical fiber adapter as claimed in claim 1, wherein the second shutter member comprising:
   a shutter plate having opposing front and back surfaces; and
   a contact projection formed on the front surface of the shutter plate, wherein a first break is formed in the contact projection for a key protrusion formed on the first optical fiber connector to pass therethrough, and wherein the contact projection is configured to be in contact with the first optical fiber connector.

13. The optical fiber adapter as claimed in claim 12, wherein the second shutter member further comprising:

an extending portion extending out from the shutter plate at an angle between 90 and 180 degrees, wherein a second break is formed in the extending portion for the key protrusion on the first optical fiber connector to pass therethrough.

14. The optical fiber adapter as claimed in claim 13, wherein the second driving portion is attached to the extending portion.

15. The optical fiber adapter as claimed in claim 1, wherein the first elastic member is integrally formed with metal, and the first shutter member is constructed of plastics.

16. An optical fiber adapter for optically coupling two optical fiber connectors with each other, the optical fiber adapter comprising:
  a main body having an accommodation room defined by a first wall, a second wall, a third wall and a fourth wall, the first wall facing the third wall and connecting with the second and fourth walls, wherein the accommodation room has opposing first and second openings in an axial direction, the second opening is configured to allow a first optical fiber connector to insert into the accommodation room;
  a first elastic member being integrally formed with a metal sheet, the first elastic member comprising:
    a first base portion including a first plate, the first plate being positioned on the third wall within the accommodation room;
    a first driving portion including a first curved sheet; and
    a first connecting portion connecting the first base portion with the first driving portion, wherein the first driving portion extends from the first connecting portion toward the first wall and is movable about the first connecting portion;
  a second elastic member being integrally formed with a metal sheet, the second elastic member comprising:
    a second base portion including a second plate, the second plate being positioned on the first wall within the accommodation room;
    a second driving portion including a second curved sheet; and
    a second connecting portion connecting the second base portion with the second driving portion, wherein the second driving portion extends from the second connecting portion toward the third wall and is movable about the second connecting portion;
  a first shutter member coupled to the first curved sheet of the first driving portion, wherein the first driving portion is configured to force the first shutter member away from the third wall; and
  a second shutter member coupled to the second curved sheet of the second driving portion, wherein the second driving portion is configured to force the second shutter member away from the first wall,
  wherein the insertion of the first optical fiber connector from the second opening is configured to push the first shutter member and the first driving portion to move toward the third wall, and to push the second shutter member and the second driving portion to move toward the first wall.

17. The optical fiber adapter as claimed in claim 16, wherein the first shutter member comprising:
  a shutter plate having opposing front and back surfaces, wherein the first curved sheet of the first driving portion is attached to the back surface of the shutter plate.

18. The optical fiber adapter as claimed in claim 17, wherein a slot is formed within the shutter plate for the first driving portion to pass therethrough, the first curved sheet is further attached to the front surface of the shutter plate.

19. The optical fiber adapter as claimed in claim 16, wherein the second shutter member comprising:
  a shutter plate having opposing front and back surfaces; and
  a contact projection formed on the front surface of the shutter plate, wherein a first break is formed in the contact projection for a key protrusion formed on the first optical fiber connector to pass therethrough, and wherein the contact projection is configured to be in contact with the first optical fiber connector.

20. The optical fiber adapter as claimed in claim 19, wherein the second shutter member further comprising:
  an extending portion extending out from the shutter plate at an angle between 90 and 180 degrees, wherein a second break is formed in the extending portion for the key protrusion on the first optical fiber connector to pass therethrough.

* * * * *